US008976386B2

(12) United States Patent
Mukasa

(10) Patent No.: US 8,976,386 B2
(45) Date of Patent: Mar. 10, 2015

(54) INFORMATION PROCESSING APPARATUS CONFIGURED TO GENERATE RECONFIGURABLE PRINT DATA, PRINT CONTROL PROGRAM, STORAGE MEDIUM, IMAGE FORMING APPARATUS AND PRINTING SYSTEM

(75) Inventor: Shinya Mukasa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 529 days.

(21) Appl. No.: 13/064,714

(22) Filed: Apr. 11, 2011

(65) Prior Publication Data
US 2011/0273741 A1 Nov. 10, 2011

(30) Foreign Application Priority Data

May 10, 2010 (JP) ................................. 2010-108384

(51) Int. Cl.
G06F 15/00 (2006.01)
G06K 1/00 (2006.01)
G06F 3/12 (2006.01)
(52) U.S. Cl.
CPC ............ G06F 3/1253 (2013.01); G06F 3/1205 (2013.01); G06F 3/1206 (2013.01); G06F 3/1245 (2013.01); G06F 3/1247 (2013.01)
USPC ............................ 358/1.15; 358/1.13; 358/1.9
(58) Field of Classification Search
None
See application file for complete search history.

(56) References Cited

U.S. PATENT DOCUMENTS

| 5,692,198 | A | 11/1997 | Ushiku |
| 6,665,081 | B1 * | 12/2003 | Suzuki et al. ................. 358/1.13 |
| 2001/0006585 | A1 * | 7/2001 | Horigane ......................... 400/70 |
| 2002/0163665 | A1 * | 11/2002 | Iwata et al. .................... 358/1.15 |
| 2004/0114184 | A1 * | 6/2004 | Sugiyama ..................... 358/1.18 |
| 2005/0052677 | A1 * | 3/2005 | Maruyama .................... 358/1.13 |
| 2006/0209343 | A1 * | 9/2006 | Wanda et al. ................. 358/1.15 |
| 2008/0151294 | A1 | 6/2008 | Natori et al. |

FOREIGN PATENT DOCUMENTS

| JP | 07121382 A | 5/1995 |
| JP | 2004171237 A | 6/2004 |
| JP | 2007265064 A | 10/2007 |
| JP | 2008186254 A | 8/2008 |
| JP | 2009146321 A | 7/2009 |
| JP | 2009251898 A | 10/2009 |

OTHER PUBLICATIONS

Abstract of JP 2009-146321 published Jul. 2, 2009.
Abstract of JP 2007-265064 published Oct. 11, 2007.
Japanese Office Action dated Feb. 4, 2014 for corresponding Japanese Application No. 2010-108384.

* cited by examiner

Primary Examiner — Ming Hon
(74) Attorney, Agent, or Firm — Harness, Dickey & Pierce, P.L.C.

(57) ABSTRACT

An information processing apparatus includes an intermediate command generating unit configured to convert print setting information to an intermediate command based on first definition data in which a rule for converting from the print setting information to the intermediate command is defined; and a print command generating unit configured to convert the intermediate command to a print command, which is interpretable by an image forming apparatus, based on second definition data in which a rule for converting from the intermediate command to the print command is defined.

14 Claims, 16 Drawing Sheets

FIG.5

DEVMODE

| ITEM NAME | VALUE | DESCRIPTION |
|---|---|---|
| dmOrientation | Portrait | PAGE ORIENTATION IS PORTRAIT |
| dmDocumentSize | 12 × 18 | DOCUMENT SIZE IS 12 × 18 INCHES |
| dmDuplex | OpenToLeft | PRINT ON BOTH SIDES AND OPEN TO THE LEFT |

FIG.6

```
1   if(dmOrientation==Portrait) iPJLAdd(iORIENTATION, PORTRAIT);
2   else iPJLAdd(iORIENTATION, LANDSCAPE);
3
4   swich(dmDocumentSize) {
5   case A4: iPJLAdd(iAPLPAGESIZE, A4);
6   case 12x18: iPJLAdd(iAPLPAGESIZE, 12X18);
7         ..
8   }
9
10  swich(dmDuplex) {
11  case Off: iPJLAdd(iDUPLEX, OFF);
12  case OpenToLeft:
13      iPJLAdd(iDUPLEX, ON);
14      iPJLAdd(iDUPLEXBINDPOS, LEFT);
15  case OpenToRight:
16      iPJLAdd(iDUPLEX, ON);
17      iPJLAdd(iDUPLEXBINDPOS, RIGHT);
18        ..
19  }
```

FIG.7

| DEVMODE STRUCTURE | | | INTERMEDIATE DATA | | |
|---|---|---|---|---|---|
| ITEM NAME | VALUE | | COMMAND NAME | VALUE | DESCRIPTION |
| dmOrientation | Portrait | | iORIENTATION | PORTRAIT | PAGE ORIENTATION IS PORTRAIT |
| dmDocumentSize | 12 × 18 | | iAPLPAGESIZE | 12 × 18 | DOCUMENT SIZE IS 12 × 18 INCHES |
| dmDuplex | OpenToLeft | | iDUPLEX | ON | DUPLEX SETTING IS ON |
| | | | iDUPLEXBINDPOS | LEFT | BINDING POSITION IS LEFT WHEN PRINTED DUPLEX |

FIG.9

```
1   if(iORIENTATION==PORTRAIT) PJL.Add(ORIENTATION, PORTRAIT);
2   else PJL.Add(ORIENTATION, LANDSCAPE);
3
4   if(iDUPLEX ==ON) PJL.Add(DUPLEX, ON);
5   else PJL.Add(DUPLEX, OFF);
6
7   swich(iDUPLEXBINDPOS) {
8   case LEFT: PJL.Add(DUPLEXBINDPOS, LEFT);
9   case RIGHT: PJL.Add(DUPLEXBINDPOS, RIGHT);
10      :
11  }
```

FIG.10

| INTERMEDIATE DATA | | PRINT DATA | | |
|---|---|---|---|---|
| COMMAND NAME | VALUE | COMMAND NAME | VALUE | DESCRIPTION |
| iORIENTATION | PORTRAIT | ORIENTATION | PORTRAIT | PAGE ORIENTATION IS PORTRAIT |
| iAPLPAGESIZE | 12 × 18 | — | — | — |
| iDUPLEX | ON | DUPLEX | ON | DUPLEX SETTING IS ON |
| iDUPLEXBINDPOS | LEFT | DUPLEXBINDPOS | LEFT | BINDING POSITION IS LEFT WHEN PRINTED DUPLEX |
| .. | .. | .. | .. | .. |

FIG.11

```
1   iPJL.Add(iPLUGINFUNC, ON);
2
3   iPJL.Delete(iDUPLEX);
4   swich(dmDuplex) {
5   case Off: iPJL.Add(iDUPLEX, OFF);
6   case OpenToLeft:
7       iPJL.Add(iDUPLEX, OPENTOLEFT);
8   case OpenToRight:
9       iPJL.Add(iDUPLEX, OPENTORIGHT);
10      :
11  }
12
14  iPJL.Delete(iDUPLEXBINDPOS);
```

FIG.12

| DEVMODE STRUCTURE | | | INTERMEDIATE DATA | | |
|---|---|---|---|---|---|
| COMMAND NAME | VALUE | | COMMAND NAME | VALUE | DESCRIPTION |
| dmOrientation | Portrait | | iORIENTATION | PORTRAIT | PAGE ORIENTATION IS PORTRAIT |
| dmDocumentSize | 12 × 18 | | iAPLPAGESIZE | 12 × 18 | DOCUMENT SIZE IS 12 × 18 INCHES |
| dmDuplex | OpenToLeft | | iDUPLEX | OFF | DUPLEX SETTING IS OFF |
| — | — | | iPLUGINFUNC | ON | PLUG-IN FUNCTION IS ON |

FIG.13

```
1  if(iPLUGINFUNC==ON) PJL.Add(PLUGINFUNC, ON);
2  else PJL.Add(PLUGINFUNC, OFF);
3
```

FIG.14

| INTERMEDIATE DATA | | PRINT DATA | | |
|---|---|---|---|---|
| COMMAND NAME | VALUE | COMMAND NAME | VALUE | DESCRIPTION |
| iORIENTATION | PORTRAIT | ORIENTATION | PORTRAIT | PAGE ORIENTATION IS PORTRAIT |
| iAPLPAGESIZE | 12 × 18 | – | – | – |
| iDUPLEX | OFF | DUPLEX | OFF | DUPLEX SETTING IS OFF |
| iPLUGINFUNC | ON | PLUGINFUNC | ON | PLUG-IN FUNCTION IS ON |

INFORMATION PROCESSING APPARATUS CONFIGURED TO GENERATE RECONFIGURABLE PRINT DATA, PRINT CONTROL PROGRAM, STORAGE MEDIUM, IMAGE FORMING APPARATUS AND PRINTING SYSTEM

CROSS-REFERENCE TO RELATED APPLICATIONS

This patent application is based upon and claims the benefit of priority of Japanese Patent Application No. 2010-108384 filed on May 10, 2010 the entire contents of which are incorporated herein by reference.

BACKGROUND OF THE INVENTION

1. Field of the Invention

The present invention is generally directed to an information processing apparatus, a print control program, a storage medium, an image forming apparatus and a printing system, and in particular to an information processing apparatus, a print control program, a storage medium, an image forming apparatus and a printing system, all of which generate print data.

2. Description of the Related Art

A printer driver converts print settings to PJL (Printer Job Language) in order to create a print command to be sent to a printer. Conventionally, printer drivers have been known which generate an intermediate command in the process of converting printing settings to a print command (see Patent Document 1, for example). By causing an external module capable of processing intermediate commands to cooperate with a printer driver, it is possible to provide extra value, such as print preview display and a change, addition or deletion of a print command.

Print commands are dependent on functions of a corresponding printer, and intermediate commands are dependent on the print commands. Accordingly, if the functions of the printer are extended, the print commands (PJL) are also extended. This requires extension of the intermediate commands in such a manner as to accommodate the extended print commands.

[Patent Document 1] Japanese Laid-open Patent Application Publication No. 2009-146321
[Patent Document 2] Japanese Laid-open Patent Application Publication No. 2008-186254

However, conventional printer drivers lack flexibility for external specification changes since their functions of generating intermediate commands are fixedly embedded in the printer drivers.

For example, in the case of extending functions of a printer, it is necessary to generate intermediate commands that accommodate the extended functions, rebuild the printer driver in such a manner as to output print commands based on the intermediate commands, and then reinstall the printer driver.

Also, when it is necessary to extend intermediate commands in accordance with function extension of an external module, a printer driver needs to be rebuilt and reinstalled.

Furthermore, in the case of accommodating a data format specific to a new external module in order for the cooperation with the new external module, a printer driver also needs to be rebuilt and reinstalled.

SUMMARY OF THE INVENTION

Accordingly, embodiments of the present invention may provide a novel and useful laminated structure solving one or more of the problems discussed above.

In view of the above-described problems, the embodiments of the present invention may provide an information processing apparatus, a print control program, a storage medium, an image forming apparatus and a printing system, all of which are capable of enhancing the flexibility of a printer driver with respect to external specification changes.

One aspect of the present invention may be to provide an information processing apparatus including an intermediate command generating unit configured to convert print setting information to an intermediate command based on first definition data in which a rule for converting from the print setting information to the intermediate command is defined; and a print command generating unit configured to convert the intermediate command to a print command, which is interpretable by an image forming apparatus, based on second definition data in which a rule for converting from the intermediate command to the print command is defined.

Another aspect of the present invention is a non-transitory computer-readable storage medium storing a print control program for causing a computer to execute a process. The process includes an intermediate command generating step of converting print setting information to an intermediate command based on first definition data in which a rule for converting from the print setting information to the intermediate command is defined; and a print command generating step of converting the intermediate command to a print command, which is interpretable by an image forming apparatus, based on second definition data in which a rule for converting from the intermediate command to the print command is defined.

Additional objects and advantages of the embodiments will be set forth in part in the description which follows, and in part may be obvious from the description, or may be learned by practice of the invention. The object and advantages of the invention may be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE DRAWINGS

FIG. 5 shows an example of a configuration of a DEVMODE structure;

FIG. 6 shows an example of a definition of an intermediate command generating script;

FIG. 7 shows an example of a conversion result from a DEVMODE structure to intermediate data;

FIG. 9 shows an example of a definition of a print command generating script;

FIG. 10 shows an example of a conversion result from the intermediate data to print data;

FIG. 11 shows an example of a definition of a plug-in intermediate command generating script;

FIG. 12 shows an example of a conversion result from a DEVMODE structure to intermediate data, which conversion result is obtained by executing an intermediate command generating script created by merging;

FIG. 13 shows an example of a definition of a plug-in print command generating script;

FIG. 14 shows an example of a conversion result from intermediate data to print data, which conversion result if obtained by executing a print command generating script created by merging;

DETAILED DESCRIPTION OF THE PREFERRED EMBODIMENTS

Figure 1:
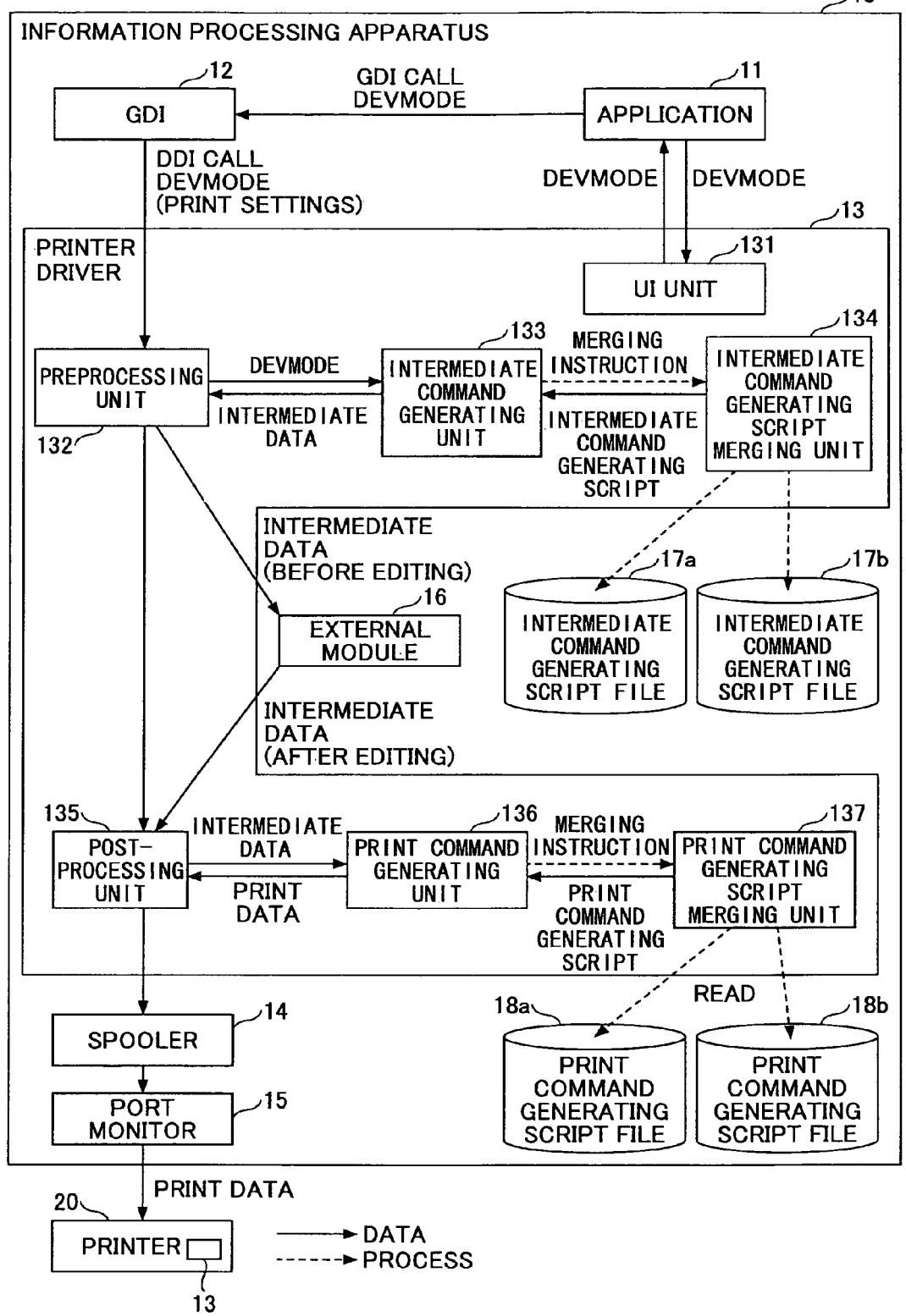
FIG. 1 shows an example of a configuration of a printing system according to a first embodiment.

Embodiments that describe the best mode for carrying out the present invention are explained next with reference to the drawings. FIG. 1 shows an example of the configuration of a printing system according to a first embodiment. In a printing system 1 of FIG. 1, an information processing apparatus 10 and a printer 20 are configured to communicate with each other via a network (either wired or wireless), such as a LAN (Local Area Network). Note that the printing system 1 may include plural information processing apparatuses 10 or plural printers 20.

In FIG. 1, the information processing apparatus 10 includes an application 11, a GDI 12, a printer driver 13, a spooler 14, a port monitor 15, an external module 16 and the like.

The application 11 is, for example, a program for generating, in response to interactive operations by a user, document data to be a print target. The GDI 12 is a so-called GDI (Graphic Device Interface), and is a set of graphics functions provided by a not-shown OS (for example, Windows (registered trademark)). In response to an input of a print instruction, the application 11 inputs a print request to the printer driver 13 via the GDI 12. The GDI 12 inputs the print request received from the application 11 to the printer driver 13 via an interface called a DDI (Device Driver Interface) of the printer driver 13.

The printer driver 13 is an example of a print control program, and generates print data according to print setting information in response to a DDI call. That is, the document data generated by the application 11 are converted to print data by the printer driver 13 via the GDI 12. The print data here means data interpretable by the printer 20 and include a print command (job control command) described in PJL (Printer Job Language), drawing data and the like.

The spooler 14 is a storage area for temporarily storing such print data. The port monitor 15 transmits the print data (PJL data and the like) stored in the spooler 14 to the printer 20, which has been specified as a print destination for the print data.

The external module 16 is an example of an external processing unit, and uses data including an intermediate command (hereinafter, referred to as "intermediate data") that is generated by the printer driver 13 in the course of generating the print data. The external module 16 provides, for example, a function of displaying the intermediate data (i.e. a print preview function), an edit function and the like. Note however that the functions provided by the external module 16 are not limited to predetermined functions. For example, the external module 16 may further convert the intermediate data to data in a different format and provide the converted data to a not-shown computer system. Note that an intermediate command is a command in a neutral (independent) format with respect to the model of the printer 20. Due to this neutrality of the intermediate command, it is possible to make the external module 16 and the like independent from the model and the like of the printer 20.

As shown in FIG. 1, the printer driver 13 includes a UI unit 131, a preprocessing unit 132, an intermediate command generating unit 133, an intermediate command generating script merging unit 134, a post-processing unit 135, a print command generating unit 136, a print command generating script merging unit 137 and the like.

The UI unit 131 displays a print settings dialog in response to a request from the application 11. The print settings dialog is a screen used for setting print setting information. The print setting information is information also referred to as print attribute information or printing conditions, and is made up of items relating to a print format and their values. In the case where Windows (registered trademark) is adopted as an OS, the print setting information set via the print settings dialog is stored in a memory as a DEVMODE structure.

The preprocessing unit 132 receives the DEVMODE structure from the application 11 via the GDI 12, and outputs intermediate data generated by the intermediate command generating unit 133 to the post-processing unit 135 (204) of the printer driver 13.

The intermediate command generating unit 133 is an interpreter of an intermediate command generating script. That is, the intermediate command generating unit 133 receives the DEVMODE structure from the preprocessing unit 132, and converts the DEVMODE structure to an intermediate command by executing an intermediate command generating script described in an intermediate command generating script file 17, to thereby generate intermediate data. The intermediate command generating script is data in a text format (a script program) in which rules for converting from a DEVMODE structure to an intermediate command are defined. That is to say, in the present embodiment, the conversion rules from a DEVMODE structure to an intermediate command (a conversion logic) are not hard-coded in the printer driver 13 but defined by a script language in the intermediate command generating script file 17, which is an external file of the printer driver 13.

In the case when there are plural intermediate command generating script files 17, the intermediate command generating script merging unit 134 integrates (merges) plural intermediate command generating scripts to generate a single intermediate command generating script file 17. For example, in the case when a plug-in for the printer driver 13 is installed, an intermediate command generating script file 17 associated with the plug-in is added, which results in plural intermediate command generating script files 17. FIG. 1 illustrates an intermediate command generating script file 17a in which a basic intermediate command generating script is described and an intermediate command generating script file 17b for a plug-in.

The post-processing unit 135 receives intermediate data from the preprocessing unit 132 and outputs print data generated by the print command generating unit 136 to the spooler 14.

The print command generating unit 136 is an interpreter of a print command generating script. That is, the print command generating unit 136 receives the intermediate data from the post-processing unit 135, and converts the intermediate command to a print command by executing a print command generating script described in a print command generating script file 18, to thereby generate print data. The print command generating script is data in a text format (a script program) in which rules for converting from an intermediate command to a print command are defined. That is to say, in the present embodiment, the conversion rules from an intermediate command to a print command (a conversion logic) are not hard-coded in the printer driver 13 but defined by a script language in the print command generating script file 18, which is an external file of the printer driver 13.

In the case when there are plural print command generating script files 18, the print command generating script merging unit 137 integrates (merges) plural print command generating scripts to generate a single print command generating script file 18. For example, in the case when a plug-in for the printer driver 13 is installed, a print command generating script file 18 associated with the plug-in is added, which results in plural print command generating script files 18. FIG. 1 illustrates a print command generating script file 18*a* in which a basic print command generating script is described and a print command generating script file 18*b* for a plug-in.

Note that in the case when the external module 16 is used, the preprocessing unit 132 outputs the intermediate data to the external module 16. Intermediate data which have been processed (edited) by the external module 16 are output to the post-processing unit 135. That is, when the external module 16 is used, the intermediate data output from the preprocessing unit 132 is input not directly to the post-processing unit 135 but input to the post-processing unit 135 via the external module 16.

According to FIG. 1, the intermediate command generating unit 133, the intermediate command generating script merging unit 134, the print command generating unit 136 and the print command generating script merging unit 137 make up part of the printer driver 13; however, each of these components may be configured as a program module independent from the printer driver 13. Herewith, in the case of extending the specification of a script, it is possible to enhance the flexibility for the extension by replacing only a program module related to the intermediate command generating unit 133 or the print command generating unit 136.

The printer 20 is an example of an image forming apparatus, and is a commonly-used printer. Note that a device having functions other than a print function, such as a multi function peripheral, may be used as the printer 20. In addition, the printer driver 13 may be recorded in a memory device of the printer 20. The printer driver 13 of the information processing apparatus 10 may be downloaded from the printer 20 to be thereby installed.

Figure 2:
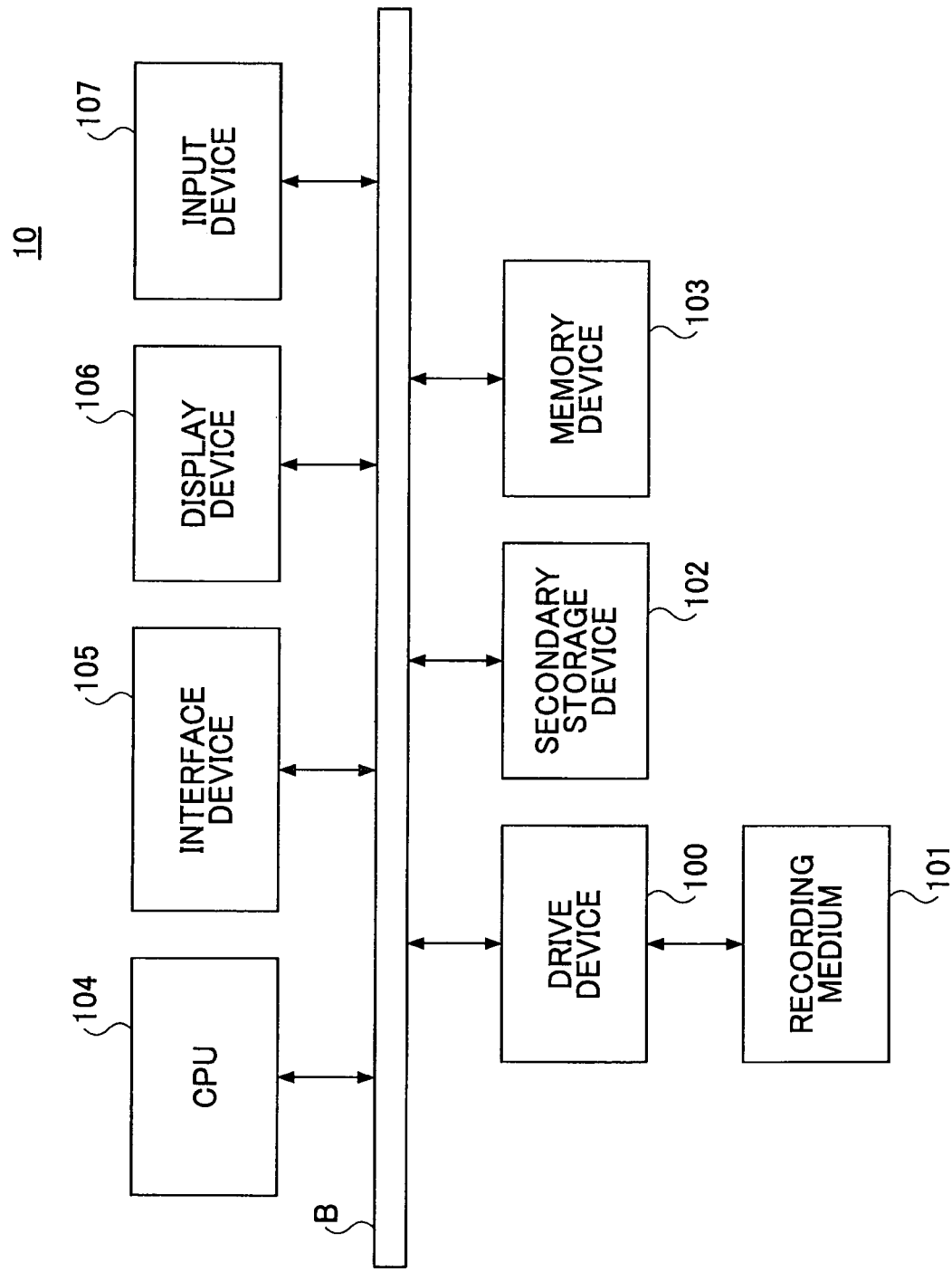
FIG. 2 shows an example of a hardware configuration of an information processing apparatus according to the first embodiment.

FIG. 2 shows an example of the hardware configuration of the information processing apparatus 10 according to the first embodiment. The information processing apparatus 10 of FIG. 2 includes a drive device 100, a secondary storage device 102, a memory device 103, a CPU 104, an interface device 105, a display device 106 and an input device 107 connected to each other by a bus B.

A program for implementing processes in the information processing apparatus 10, such as the printer driver 13, is provided by a recording medium 101, which is a CD-ROM, for example. When the recording medium 101 having a program stored therein is set in the drive device 100, the program is installed in the secondary storage device 102 from the recording medium 101 via the drive device 100. Note that the program installation is not necessarily performed using the recording medium 101, and may be performed by downloading the program from another computer via a network. The secondary storage device 102 stores installed programs as well as necessary files and data and the like. For example, the secondary storage device 102 stores the intermediate command generating script file 17 and the print command generating script file 18, and functions as a definition data storing unit.

When receiving an instruction to start up a program, the memory device 103 reads the program from the secondary storage device 102 and stores the program. The CPU 104 implements functions of the information processing apparatus 10 according to the program stored in the memory device 103. The interface device 105 is used as an interface for network connection. The display device 106 displays a GUI (Graphical User Interface) and the like according to the program. The input unit 107 includes a keyboard, a mouse and the like, and is used to input various operational instructions.

Figure 3:
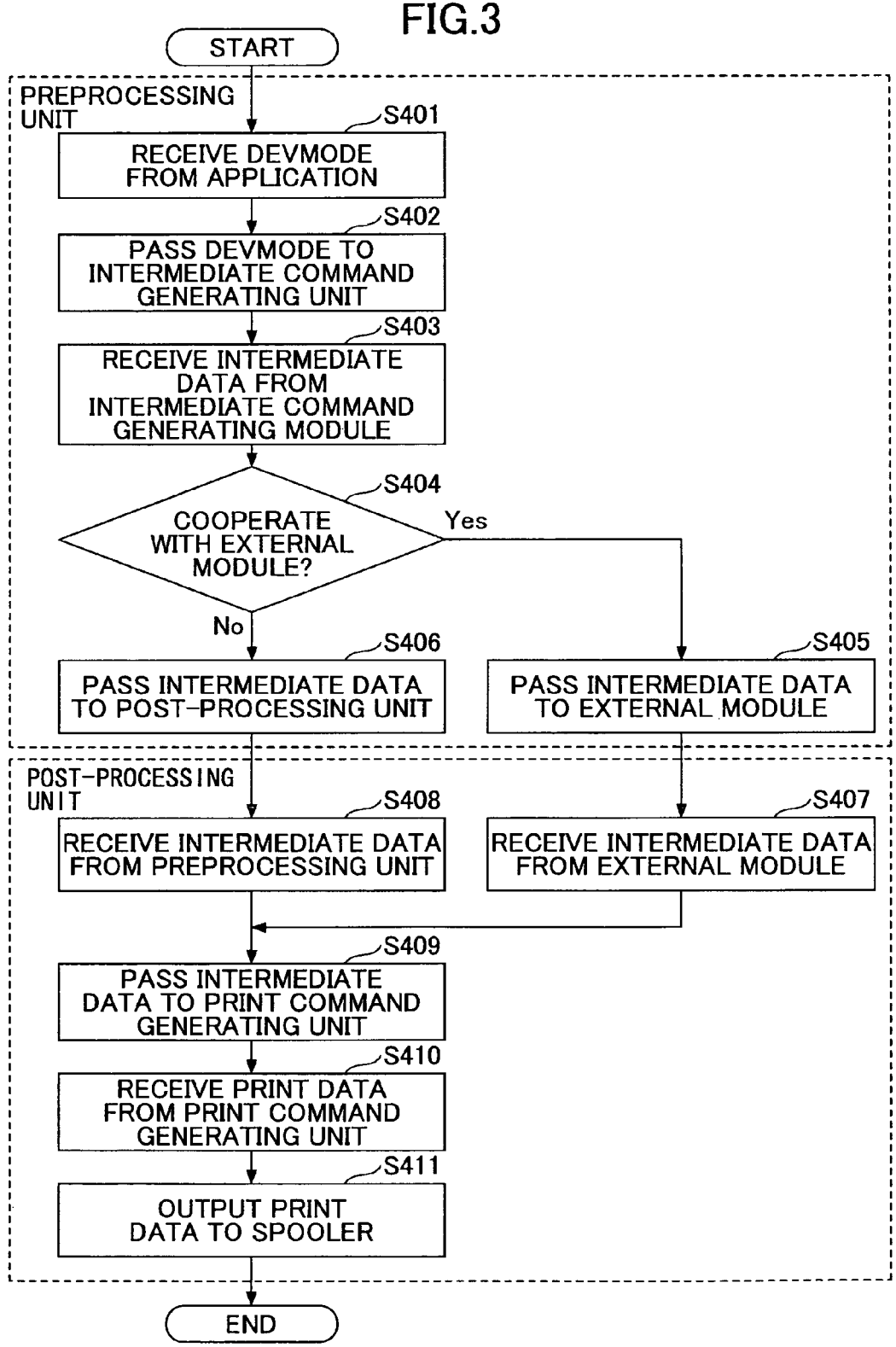
FIG. 3 is a flowchart illustrating operating procedures of a preprocessing unit and a post-processing unit.

Next are described operating procedures of the information processing apparatus 10. FIG. 3 is a flowchart illustrating the operating procedures of the preprocessing unit 132 and the post-processing unit 135. Assume that at the start of the operating procedures of FIG. 3, a print instruction has already been input via, for example, a menu of the application 11, and print setting information has been input in the print settings dialog displayed by the UI unit 131 of the printer driver 13. Accordingly, in a DEVMODE structure stored in the memory device 103, setting values and the like set in the print settings dialog have been stored.

After an OK button is pressed in the print settings dialog, the preprocessing unit 132 receives the DEVMODE structure from the application 11 via the GDI 12 (S401). Subsequently, the preprocessing unit 132 requests the intermediate command generating unit 133 to generate intermediate data, specifying the DEVMODE structure (S402). The preprocessing unit 132 then receives the intermediate data output from the intermediate command generating module (S403).

Subsequently, the preprocessing unit 132 determines the necessity of cooperation with the external module 16 (S404). The necessity of cooperation may be determined based, for example, on whether installation information of the external module 16 is recorded in a predetermined storage area, such as a registry. That is, when the installation information is recorded, the preprocessing unit 132 determines that the cooperation is necessary. On the other hand, when the installation information is not recorded (i.e., when the external module 16 has not been installed), the preprocessing unit 132 determines that the cooperation is unnecessary. Note that this criterion is merely an example, and the determination of Step S404 may be made based on other criteria.

In the case of determining that the cooperation is necessary (S404: Yes), the preprocessing unit 132 outputs the intermediate data to the external module 16 (S405). Accordingly, in this case, the intermediate data is used by the external module 16. In the case of determining that the cooperation is unnecessary (S404: No), the preprocessing unit 132 outputs the intermediate data to the post-processing unit 135 (S406).

Subsequently, the post-processing unit 135 receives the intermediate data. That is, in the case when the printer driver 13 is in cooperation with the external module 16, the post-processing unit 135 receives the intermediate data from the external module 16 (S407). On the other hand, in the case when the printer driver 13 is not in cooperation with the external module 16, the post-processing unit 135 receives the intermediate data from the preprocessing unit 132 (S408).

Subsequently, the post-processing unit 135 requests the print command generating unit 136 to generate print data, specifying the intermediate data (S409). The post-processing unit 135 then receives print data (PJL data) generated by the print command generating unit 136 (S410). Next, the post-processing unit 135 outputs the print data to the spooler 14 (S411). Subsequently, the print data are transferred to the printer 20, which then prints using the print data.

Next are described operating procedures implemented by the intermediate command generating unit 133 and the intermediate command generating script merging unit 134 in response to the intermediate data generation request from the preprocessing unit 132 in Step S402.

Figure 4:
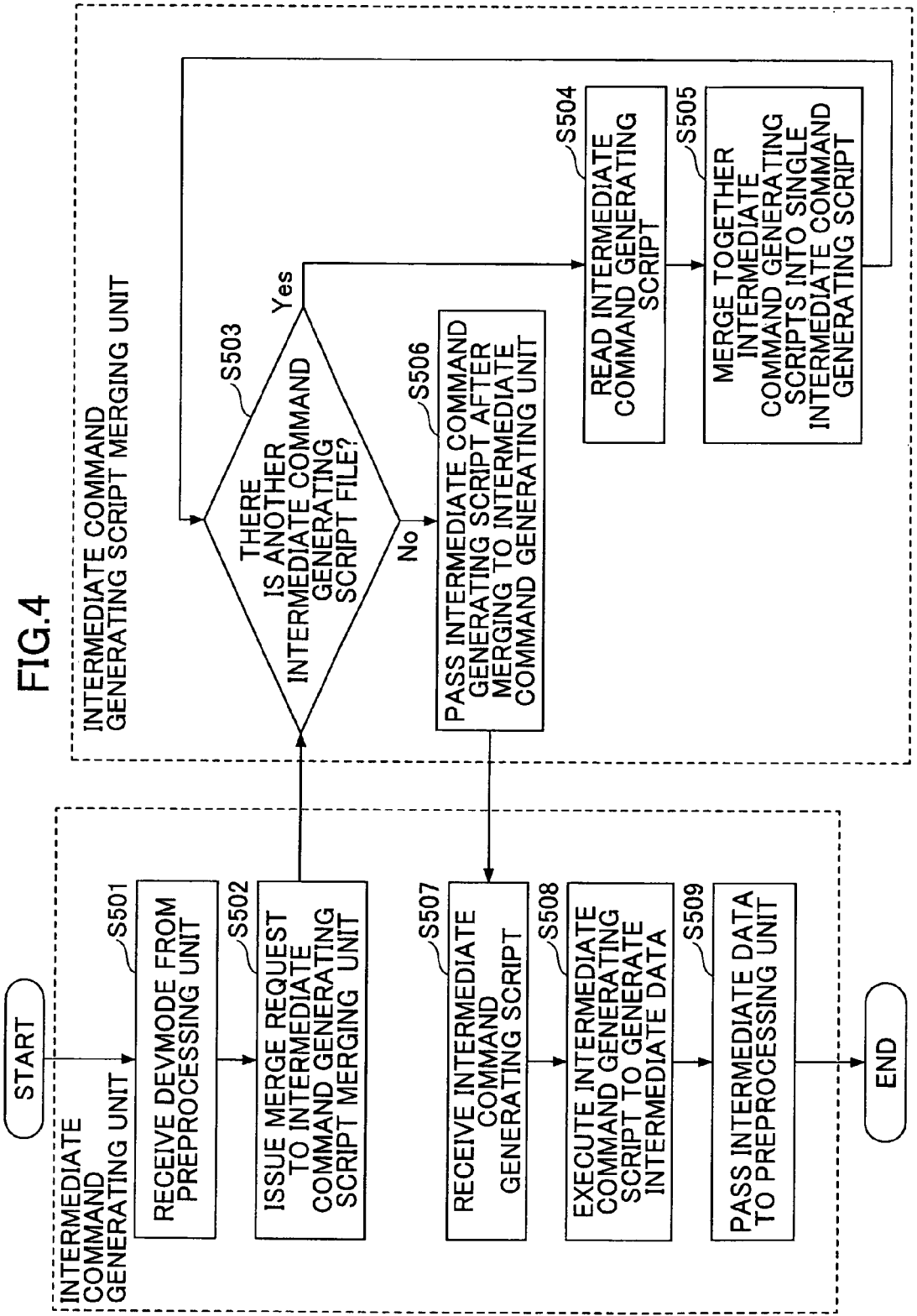
FIG. 4 is a flowchart, illustrating operating procedures implemented by an intermediate command generating unit and an intermediate command generating script merging unit.

FIG. 4 is a flowchart illustrating the operating procedures implemented by the intermediate command generating unit 133 and the intermediate command generating script merging unit 134.

The intermediate command generating unit 133 receives, from the preprocessing unit 132, the intermediate data generation request in which the DEVMODE structure is specified (S501).

FIG. 5 shows an example of the configuration of the DEVMODE structure. In FIG. 5, a partial configuration of the DEVMODE structure is expressed in a tabular form. In the table, an item name (a member variable name), a value and a description are shown with respect to each item (a member variable) of the DEVMODE structure. As can be understood from the column of the description, FIG. 5 shows examples of values (setting values) for sheet orientation (dmOrientation), document size (dmDocumentSize) and print side and open direction (dmDuplex). Thus, in the DEVMODE structure, a setting value is stored for each item making up the print setting information.

Subsequently, the intermediate command generating unit 133 requests the intermediate command generating script merging unit 134 to merge the intermediate command generating script files 17 (S502).

The intermediate command generating script merging unit 134 reads, to the memory device 103, one by one the contents of the intermediate command generating script files 17 pre-stored in a predetermined storage area (a folder, for example) of the secondary storage device 102 (S504).

FIG. 6 shows an example of definition of an intermediate command generating script. The definition contents of FIG. 6 are as follows.

In the first and second lines, the process branches by the value of the dmOrientation item of the DEVMODE structure. That is, in the case when the value of the item is "Portrait", an iORIENTATION command is added to iPJL to make the value of the command "PORTRAIT". On the other hand, in the case when the value of the item is not "Portrait", an iORIENTATION command is added to iPJL to make the value of the command "LANDSCAPE". Note that iPJL is a variable indicating intermediate data.

Accordingly, "**** is added to iPJL" means that a definition regarding **** is added to the intermediate data.

In the fourth to eighth lines, the process branches by the value of the dmDocumentSize item of the DEVMODE structure. For example, in the case when the value of the item is "A4", an iAPLPAGESIZE command is added to iPJL to make the value of the command "A4". In the case when the value of the item is "12×18", an iAPLPAGESIZE command is added to iPJL to make the value of the command "12×18". Explanation for other cases is omitted.

In the tenth to nineteenth lines, the process branches by the value of the dmDuplex item of the DEVMODE structure. For example, in the case when the value of the item is "Off", an iDUPLEX command is added to iPJL to make the value of the command "OFF". In the case when the value of the item is "OpenToLeft", an iDUPLEX command is added to iPJL to make the value of the command "ON". In addition, an iDUPLEXBINDPOS command is added to iPJL to make the value of the command "LEFT". On the other hand, in the case when the value of the item is "OpenToRight", an iDUPLEX command is added to iPJL to make the value of the command "ON". In addition, an iDUPLEXBINDPOS command is added to iPJL to make the value of the command "RIGHT". Explanation for other cases is omitted.

Next, in the case when there is an already read intermediate command generating script, the intermediate command generating script merging unit 134 merges together this intermediate command generating script and the intermediate command generating script read in Step S504 into a single intermediate command generating script (S505). The term "to merge together" here means adding the descriptive contents of the intermediate command generating script read in Step S504 to a part following the last line of the already read intermediate command generating script. Accordingly, the merging process may also be referred to as "coupling".

Once all intermediate command generating script files 17 are read (S503: No), the intermediate command generating script merging unit 134 outputs the intermediate command generating script after the merging to the intermediate command generating unit 133 (S506).

When receiving the intermediate command generating script output from the intermediate command generating script merging unit 134 (S507), the intermediate command generating unit 133 executes the intermediate command generating script (S508). As a result, the conversion of the DEVMODE structure to the intermediate data is achieved.

FIG. 7 shows an example of a conversion result from a DEVMODE structure to intermediate data. FIG. 7 shows a conversion result obtained when the intermediate command generating script of FIG. 6 is executed with the DEVMODE structure of FIG. 5.

Specifically, (dmOrientation, Portrait) of the DEVMODE structure is converted to an intermediate command (iORIENTATION, PORTRAIT). Note that the DEVMODE structure is written in the form of (item name, value), and the intermediate command is written in the form of (command name, value).

In addition, (dmDocumentSize, 12×18) of the DEVMODE structure is converted to an intermediate command (iAPLPAGESIZE, 12×18). (dmDuplex, OpenToLeft) of the DEVMODE structure is converted to intermediate commands (iDUPLEX, ON) and (iDUPLEXBINDPOS, LEFT). Note that, as is clearly shown by the last conversion example, items (member variables) of the DEVMODE structure do not necessarily have to correspond one-to-one with intermediate commands.

Subsequently, the intermediate command generating unit 133 outputs the converted intermediate data to the preprocessing unit 132 (S509).

Next are described operating procedures implemented by the print command generating unit 136 and the print command generating script merging unit 137 in response to the print data generation request from the post-processing unit 135 in Step S409.

Figure 8:
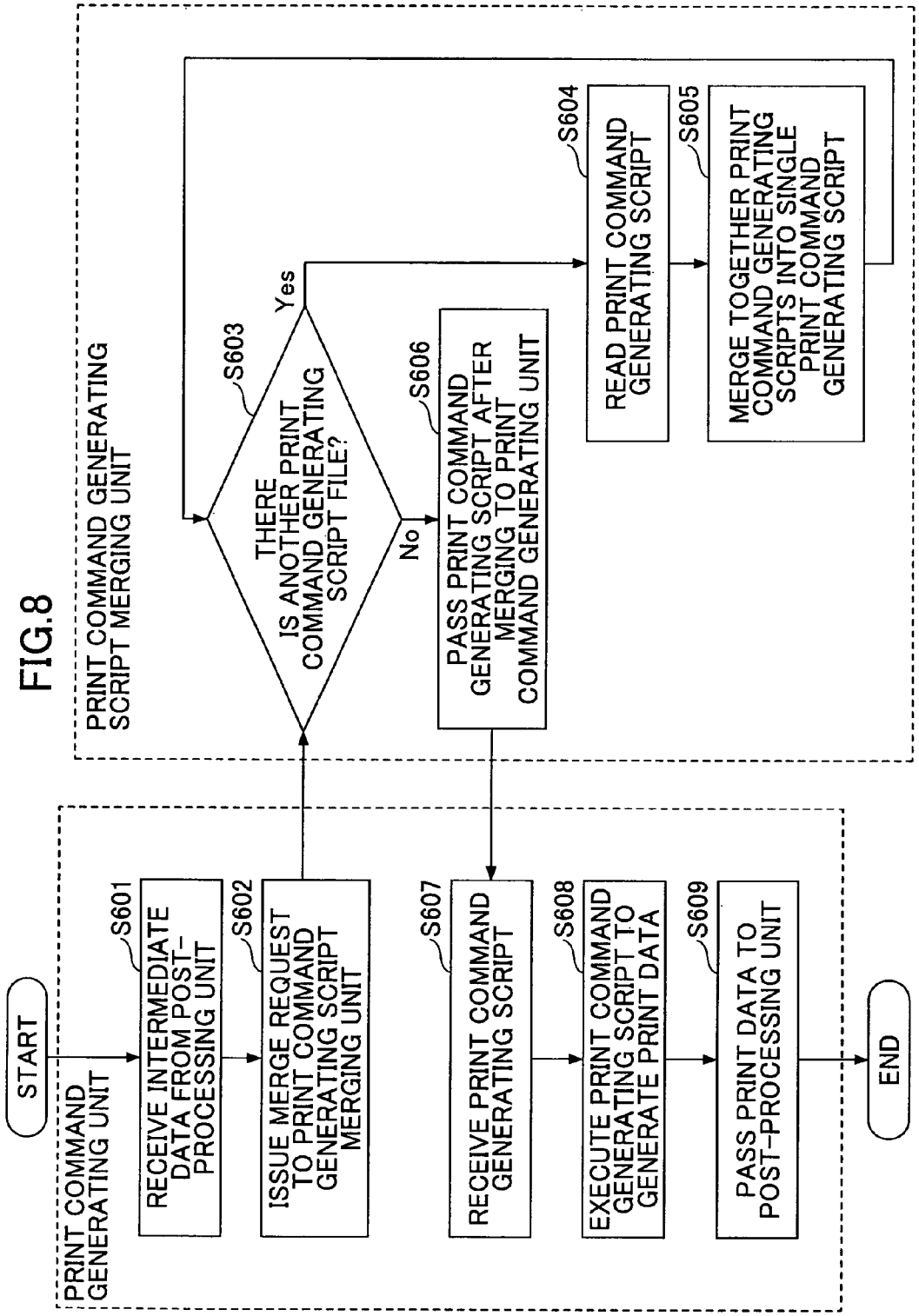
FIG. 8 is a flowchart illustrating operation procedures implemented by a print command generating unit and a print command generating script merging unit.

FIG. 8 is a flowchart illustrating the operating procedures implemented by the print command generating unit 136 and the print command generating script merging unit 137.

The print command generating unit 136 receives, from the post-processing unit 135, the print data generation request in which the intermediate data are specified (S601). Subsequently, the print command generating unit 136 requests the print command generating script merging unit 137 to merge the print command generating script files 18 (S602).

The print command generating script merging unit 137 reads, to the memory device 103, one by one the contents of the print command generating script files 18 prestored in a predetermined storage area (a folder, for example) of the secondary storage device 102 (S604).

FIG. 9 shows an example of definition of a print command generating script. The definition contents of FIG. 9 are as follows.

In the first and second lines, the process branches by the value of the intermediate command iOrientation. That is, in the case when the value of the intermediate command is "PORTRAIT", an ORIENTATION command is added to PJL to make the value of the command "PORTRAIT". In the case when the value of the intermediate command is not "POR-TRAIT", an ORIENTATION command is added to PJL to make the value of the command "LANDSCAPE". Note that PJL is a variable indicating print data.

In the fourth and fifth lines, the process branches by the value of the intermediate command iDUPLEX. In the case when the value of the intermediate command is "ON", a DUPLEX command is added to PJL to make the value of the command "ON". On the other hand, when the value of the intermediate command is not "ON", a DUPLEX command is added to PJL to make the value of the command "OFF".

In the seventh to eleventh lines, the process branches by the value of the intermediate command iDUPLEXBINDPOS. That is, in the case when the value of the intermediate command is "LEFT", a DUPLEXBINDPOS command is added to PJL to make the value of the command "LEFT". On the other hand, when the value of the intermediate command is "RIGHT", a DUPLEXBINDPOS command is added to PJL to make the value of the command "RIGHT". Explanation for other cases is omitted.

Next, in the case when there is an already read print command generating script, the print command generating script merging unit 137 merges together this print command generating script and the print command generating script read in Step S604 into a single print command generating script (S605). The meaning of the term "to merge together" here is similar to that for the intermediate command generating script. That is, the term "to merge together" here means adding the descriptive contents of the print command generating script read in Step S604 to a part following the last line of the already read print command generating script.

Once all print command generating script files 18 are read (S603: No), the print command generating script merging unit 137 outputs the print command generating script after the merging to the print command generating unit 136 (S606).

When receiving the print command generating script output from the print command generating script merging unit 137 (S607), the print command generating unit 136 executes the print command generating script (S608). As a result, the conversion of the intermediate data to the print data is achieved.

FIG. 10 shows an example of a conversion result from intermediate data to print data. FIG. 10 shows a conversion result obtained when the print command generating script of FIG. 9 is executed with the intermediate data of FIG. 7.

Specifically, the intermediate command (iORIENTATION, PORTRAIT) is converted to a print command (ORIENTATION, PORTRAIT). There is no print command corresponding to the intermediate command (iAPLPAGESIZE, 12×18). The intermediate command (iDUPLEX, ON) is converted to a print command (DUPLEX, ON). The intermediate command (iDUPLEXBINDPOS, LEFT) is converted to a print command (DUPLEXBINDPOS, LEFT). Note that intermediate commands do not necessarily have to correspond one-to-one with print commands.

Subsequently, the print command generating unit 136 outputs the converted print data to the post-processing unit 135 (S609).

Next is described a case in which, for example, a plug-in for the printer driver 13 is installed, and the plug-in intermediate command generating script file 17*b* and the plug-in print command generating script file 18*b* are installed (added).

FIG. 11 shows an example of definition of a plug-in intermediate command generating script a plug-in. The definition contents of FIG. 11 are as follows.

In the first line, an iPLUGINFUNC command is added to iPJL (intermediate data) to make the value of the command "ON".

In the third to eleventh lines, an iDUPLEX command of iPJL is overwritten. That is, in the case when the value of the dmDuplex item of the DEVMODE structure is "Off", the value of the iDUPLEX command of iPJL is overwritten with "OFF". In the case when the value of the item is "OpenToLeft", the value of the iDUPLEX command of iPJL is overwritten with "OPENTOLEFT". In the case when the value of the item is "OpenToRight", the value of the iDUPLEX command of iPJL is overwritten with "OPENTORIGHT". Explanation for other cases is omitted.

The expression "to be overwritten" is used here for the following reason. That is, in the case when the plug-in intermediate command generating script is merged together with the intermediate command generating script of FIG. 6, the plug-in intermediate command generating script is executed later. As a result, for the same intermediate commands, the definition contents of the intermediate command generating script of FIG. 6 are overwritten with the definition contents of the plug-in intermediate command generating script. That is, as for intermediate command generating scripts, a latter definition has a priority over a former definition. This is also the case for print command generating scripts.

In the fourteenth line, the iDUPLEXBINDPOS command is deleted from iPJL.

FIG. 12 shows an example of a conversion result obtained when an intermediate command generating script generated as a result of merging together the definition contents of FIG. 6 and the definition contents of FIG. 11 is executed with the DEVMODE structure of FIG. 5.

FIG. 12 shows an example of a conversion result from a DEVMODE structure to intermediate data, which conversion result is obtained by executing an intermediate command generating script created by the merging.

When the contents of the intermediate data of FIG. 12 are compared to those of the intermediate data of FIG. 7, the value of the iDUPLEX command of FIG. 12 is "OFF". In addition, an iPLUGINFUNC command has been added.

FIG. 13 shows an example of the definition of a plug-in print command generating script. The definition contents of FIG. 13 are as follows.

In the first and second lines, the process branches by the value of the intermediate command iPLUGINFUNC. That is, in the case when the value of the intermediate command is "ON", a PLUGINFUNC command is added to PJL (print data) to make the value of the command "ON". On the other hand, in the case when the value of the intermediate command is not "ON", a PLUGINFUNC command is added to PJL to make the value of the command "OFF".

Note that the iPLUGINFUNC command and PLUGNFUNC command are commands indicating whether the plug-in function is ON or not (whether the plug-in has been installed or not). However, the use of these commands (how the commands are used) is defined on the external module 16 side and the printer 20 side, respectively.

FIG. 14 shows an example of a conversion result obtained when a print command generating script generated as a result of merging together the definition contents of FIG. 9 and the definition contents of FIG. 13 is executed with the intermediate data of FIG. 12.

FIG. 14 shows an example of a conversion result from intermediate data to print data, which conversion result is obtained by executing a print command generating script created by the merging.

When the contents of the print data of FIG. 14 are compared to those of the print data of FIG. 10, the value of the DUPLEX command of FIG. 14 is "OFF". In addition, a PLUGINFUNC command has been added.

As has been described above, according to the first embodiment, even if the specification of print commands is changed or the specification of the external module 16 is changed, it is possible to deal with such changes by editing, adding or the like an intermediate command generating script file 17 or a print command generating script file 18. This can reduce the necessity of modification and reinstallation of the source codes of the printer driver 13.

In the case when there are plural intermediate command generating script files 17 or plural print command generating script files 18, the plural script files of each type are integrated together to form a single script file. Accordingly, each script file can be managed in an independent manner. This facilitates deletion of an unnecessary script file in the case of uninstalling a plug-in or the like.

Note that in a newly added intermediate command generating script or print command generating script, it is possible not only to simply add a new intermediate command or print command, but also to change or negate a definition in an existing script. Accordingly, for example, even in the case when the printer 20 or the external module 16 has no function extension or the like, the manager or the like can edit an existing script file or add a new script file, to thereby impose limits on functions (values of the print setting items) available for each user.

Next is described a second embodiment. Note that points not particularly mentioned in the second embodiments are the same as those in the first embodiment.

Figure 15:
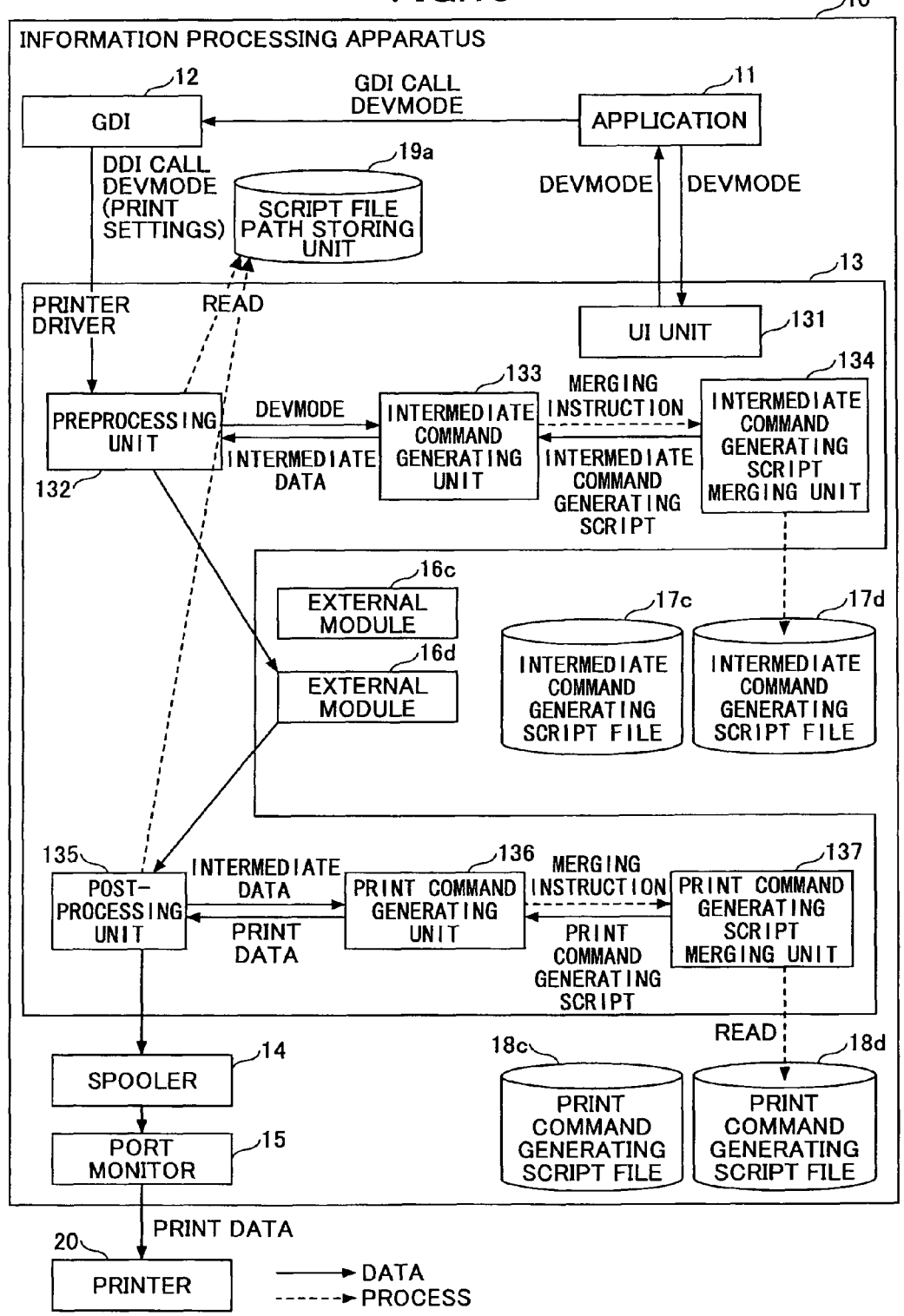
FIG. 15 shows an example of a configuration of a printing system according to a second embodiment.

FIG. 15 shows an example of the configuration of a printing system according to the second embodiment. Note that in FIG. 15, the same reference numerals are given to the components which are common to those of FIG. 1, and their explanations are omitted.

As shown in FIG. 15, the information processing apparatus 10 includes plural external modules 16. The information processing apparatus 10 also has a set of the intermediate command generating script file 17 and the print command generating script file 18 with respect to each external module 16. Specifically, an intermediate command generating script file 17c and a print command generating script file 18c correspond to an external module 16c, and an intermediate command generating script file 17d and a print command generating script file 18d correspond to an external module 16d.

Furthermore, the information processing apparatus 10 includes a script file path storing unit 19a. The script file path storing unit 19a stores, for identification information of each external module 16, identification information (file path names, for example) of corresponding script files (i.e., corresponding intermediate command generating script file 17 and print command generating script file 18), using the secondary storage device 102.

That is, according to the second embodiment, an intermediate command generating script file 17 and a print command generating script file 18 to be used are dynamically changed depending on which external module 16 is to be used.

The external module 16 to be used may be selected, for example, in the print settings dialog. In this case, the identification information of the selected external module 16 may be recorded in the DEVMODE structure. Alternatively, the identification information of the external module 16 to be used may be recorded in advance in a setting file or the like.

In either case, the intermediate command generating script merging unit 134 functions as a first acquiring unit to acquire, from the script file path storing unit 19a, a file path name of an intermediate command generating script file 17 that corresponds to the identification information of the external module 16 to be used, and limits an intermediate command generating script file 17 to be merged to one having the acquired file path name. Accordingly, in this case, intermediate data are generated by the intermediate command generating unit 133 based on an intermediate command generating script corresponding to the external module 16 to be used. Note that the acquisition of the file path name from the script file path storing unit 19a may be performed by the preprocessing unit 132 or the intermediate command generating unit 133, as long as the acquired file path name is communicated to the intermediate command generating script merging unit 134.

In the same manner, the print command generating script merging unit 137 functions as a second acquiring unit to acquire, from the script file path storing unit 19a, a file path name of a print command generating script file 18 that corresponds to the identification information of the external module 16 to be used, and limits a print command generating script file 18 to be merged to one having the acquired file path name. Accordingly, in this case, print data are generated by the print command generating unit 136 based on a print command generating script corresponding to the external module 16 to be used. Note that the acquisition of the file path name from the script file path storing unit 19a may be performed by the post-processing unit 135 or the print command generating unit 136, as long as the acquired file path name is communicated to the print command generating script merging unit 137.

As has been described above, according to the second embodiment, it is possible to dynamically change script files to be used with respect to each external module 16. Note that as for the plural intermediate command generating script files 17 and the plural print command generating script files 18, one of the script files of each type may be a versatile (basic) script file while each of the remaining script files may be one specific to a different one of the external modules 16.

Next is described a third embodiment. Note that points not particularly mentioned in the third embodiments are the same as those in the first embodiment.

Figure 16:
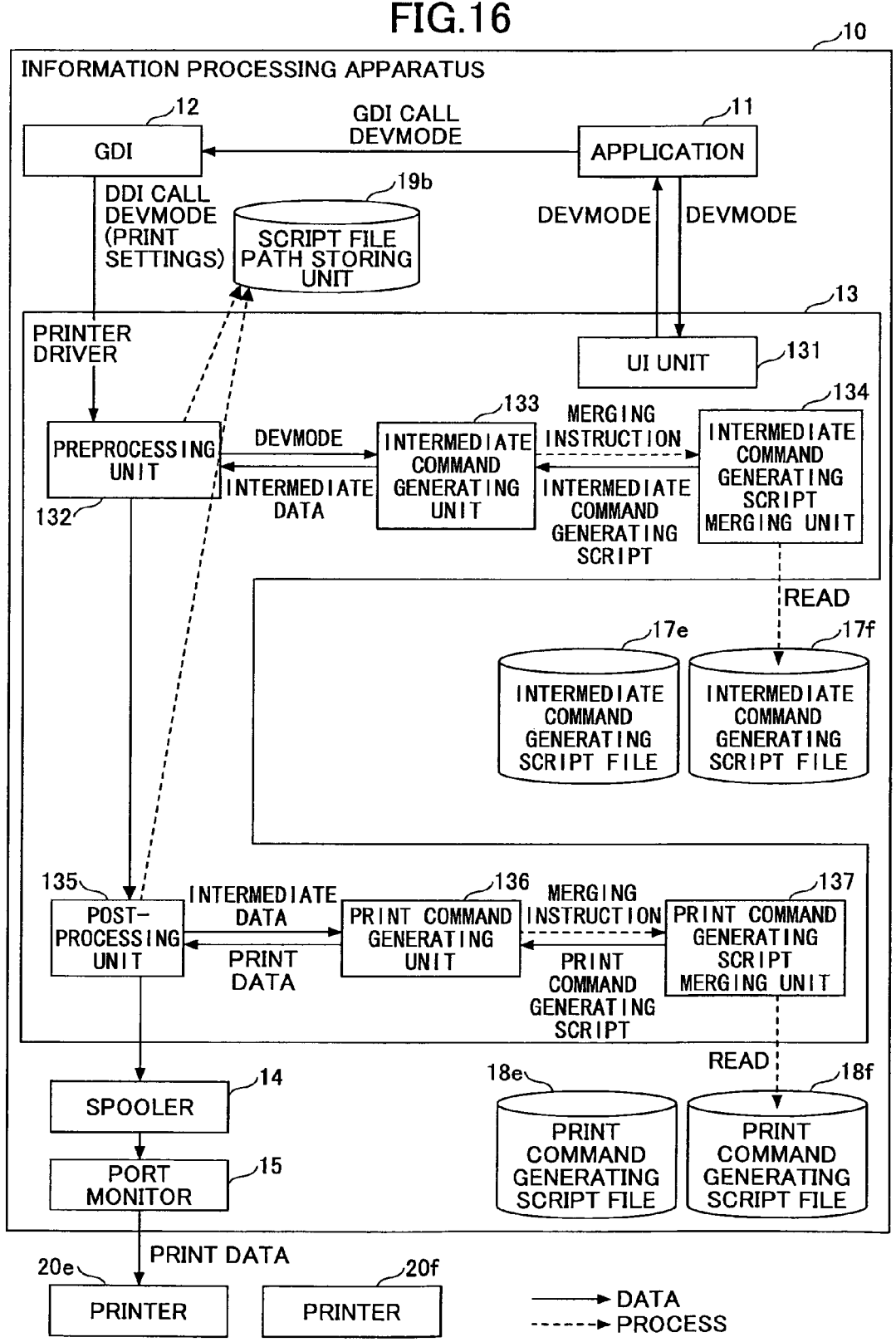
FIG. 16 shows an example of a configuration of a printing system according to a third embodiment.

FIG. 16 shows an example of the configuration of a printing system according to the third embodiment. Note that in FIG. 16, the same reference numerals are given to the components which are common to those of FIG. 1, and their explanations are omitted.

As shown in FIG. 16, the information processing apparatus 10 can select a print destination from more than one printer 20. The information processing apparatus 10 has a set of the intermediate command generating script file 17 and the print command generating script file 18 with respect to each printer 20. Specifically, an intermediate command generating script file 17e and a print command generating script file 18e correspond to a printer 20e, and an intermediate command generating script file 17f and a print command generating script file 18f correspond to a printer 20f. Furthermore, the information processing apparatus 10 includes a script file path storing unit 19b. The script file path storing unit 19b stores for identification information of each printer 20 (hereinafter, referred to as the "printer name"), identification information (file path names, for example) of corresponding script files (i.e., corresponding intermediate command generating script file 17 and print command generating script file 18), using the secondary storage device 102.

That is, according to the third embodiment, an intermediate command generating script file 17 and a print command generating script file 18 to be used are dynamically changed depending on which printer 20 is to be used as a print destination.

The printer 20 to be used as a print destination may be selected, for example, in the print settings dialog and the printer name of the selected printer 20 may be recorded in the DEVMODE structure. Alternatively, the printer name may be recorded in advance in a setting file or the like.

In either case, the intermediate command generating script merging unit 134 functions as a first acquiring unit to acquire, from the script file path storing unit 19b, a file path name of an intermediate command generating script file 17 that corresponds to the printer name of the printer 20 to be used as a print destination, and limits an intermediate command generating script file 17 to be merged to one having the acquired file path name. Accordingly, in this case, intermediate data are generated by the intermediate command generating unit 133 based on an intermediate command generating script corresponding to the printer 20 to be used as a print destination. Note that the acquisition of the file path name from the script file path storing unit 19b may be performed by the preprocessing unit 132 or the intermediate command generating unit 133, as long as the acquired file path name is communicated to the intermediate command generating script merging unit 134.

In the same manner, the print command generating script merging unit 137 functions as a second acquiring unit to acquire, from the script file path storing unit 19b, a file path name of a print command generating script file 18 that corresponds to the printer name of the printer 20 to be used as a print destination, and limits a print command generating script file 18 to be merged to one having the acquired file path name. Accordingly, in this case, print data are generated by the print command generating unit 136 based on a print command generating script corresponding to the printer 20 to be used as a print destination. Note that the acquisition of the file path name from the script file path storing unit 19b may be performed by the post-processing unit 135 or the print command generating unit 136, as long as the acquired file path name is communicated to the print command generating script merging unit 137.

As has been described above, according to the third embodiment, it is possible to dynamically change script files to be used with respect to each printer 20. Note that as for the plural intermediate command generating script files 17 and the plural print command generating script files 18, one of the script files of each type may be a versatile (basic) script file while each of the remaining script files may be one specific to a different one of the printers 20.

In addition, the file path names of the script files to be used may be obtained from a corresponding printer 20 by bidirectional communications. Or, an entity of the script files may be acquired from the printer 20 using the bidirectional communications.

In conclusion, the information processing apparatus according to the present invention is capable of enhancing the flexibility of the printer driver for external specification changes.

The information processing apparatus of the present invention has been described based on the embodiments above; however, it is a matter of course that the present invention is not limited to these embodiment.

In the above embodiments, the information processing apparatus is used; however, the present invention may be a computer-readable storage medium storing a print control program for causing a computer to execute a process including the steps shown in the flowcharts above.

Also, the present invention may be an image forming apparatus storing such a print control program.

Furthermore, the present invention may be a printing system including such a print control program and an image forming apparatus which implements a printing job based on the print command.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
   an intermediate command generating unit configured to convert print setting information to an intermediate command based on first definition data in which a rule for converting from the print setting information to the intermediate command is defined;
   a print command generating unit configured to convert the intermediate command to a print command, which is interpretable by an image forming apparatus, based on second definition data in which a rule for converting from the intermediate command to the print command is defined;
   an external processing unit configured to use the intermediate command;
   a first correspondence information storing unit storing correspondence information indicating correspondence between one or more of the external processing units and one or more pieces of the first definition data; and
   a first acquiring unit configured to, using the first correspondence information storing unit, acquire a piece of the first definition data corresponding to one of the external processing units to be used out of the one or more pieces of the first definition data that are recorded in a definition data storing unit, wherein
   the intermediate command generating unit converts the print setting information to the intermediate command based on the acquired piece of the first definition data.

2. The information processing apparatus as claimed in claim 1, wherein
   the correspondence information further indicates a correspondence between one or more of the external processing units and one or more pieces of the second definition data; and the information processing apparatus further comprises:
   a second acquiring unit configured to, using the first correspondence information storing unit, acquire a piece of the second definition data corresponding to one of the external processing units to be used out of the one or more pieces of the second definition data, wherein the print command generating unit converts the intermediate command to the print command based on the acquired piece of the second definition data.

3. The information processing apparatus as claimed in claim 1, further comprising:

a second correspondence information storing unit storing correspondence information indicating correspondence between one or more of the image forming apparatuses and one or more pieces of the second definition data; and a second acquiring unit configured to, using the second correspondence information storing unit, acquire a piece of the second definition data corresponding to one of the image forming apparatuses selected as a print destination out of the one or more pieces of the second definition data, wherein the print command generating unit converts the intermediate command to the print command based on the acquired piece of the second definition data.

4. The information processing apparatus as claimed in claim 1, further comprising:

a first integrating unit configured to integrate plural pieces of the first definition data, wherein the intermediate command generating unit converts the print setting information to the intermediate command based on the integrated first definition data.

5. The information processing apparatus as claimed in claim 1, further comprising:

a second integrating unit configured to integrate plural pieces of the second definition data, wherein the print command generating unit converts the intermediate command to the print command based on the integrated second definition data.

6. The information processing apparatus of claim 1, wherein a structure of the intermediate command is unrelated to the image forming apparatus utilized by the information processing apparatus.

7. The information processing apparatus of claim 1, wherein the first definition data and the second definition data are not hard-coded in the print control program.

8. The information processing apparatus of claim 1, wherein the intermediate command generating unit is configured to convert, using the first definition data, the print setting information to the intermediate command with reference to an interrelationship between the first definition data and the external processing unit.

9. A non-transitory computer-readable storage medium storing a print control program for causing a computer to execute a process, the process comprising:

an intermediate command generating step of converting print setting information to an intermediate command based on first definition data in which a rule for converting from the print setting information to the intermediate command is defined;

a print command generating step of converting the intermediate command to a print command, which is interpretable by an image forming apparatus, based on second definition data in which a rule for converting from the intermediate command to the print command is defined; and a first acquiring step of, by using an external processing unit configured to use the intermediate command and a first correspondence information storing unit storing correspondence information indicating correspondence between one or more of the external processing units and one or more pieces of the first definition data, acquiring a piece of the first definition data corresponding to one of the external processing units to be used out of the one or more pieces of the first definition data that are recorded in a definition data storing unit, wherein in the intermediate command generating step, the print setting information is converted to the intermediate command based on the acquired piece of the first definition data.

10. The non-transitory computer-readable storage medium as claimed in claim 8, wherein the process further comprises:

a second acquiring step of acquiring a piece of the second definition data using the external processing unit, wherein the correspondence information further indicates a correspondence between one or more of the external processing units and one or more pieces of the second definition data, the acquired piece of second definition data corresponds to one of the external processing units to be used out of the one or more pieces of the second definition data that are recorded in the definition data storing unit, and in the print command generating step, the intermediate command is converted to the print command based on the acquired piece of the second definition data.

11. The non-transitory computer-readable storage medium as claimed in claim 8, wherein the process further comprises:

a second acquiring step of, by using a second correspondence information storing unit storing correspondence information indicating correspondence between one or more of the image forming apparatuses and one or more pieces of the second definition data, acquiring a piece of the second definition data corresponding to one of the image forming apparatuses selected as a print destination out of the one or more pieces of the second definition data that are recorded in the definition data storing unit, and wherein, in the print command generating step, the intermediate command is converted to the print command based on the acquired piece of the second definition data.

12. The non-transitory computer-readable storage medium as claimed in claim 9, wherein the process further comprises:

a first integrating step of integrating plural pieces of the first definition data, and wherein, in the intermediate command generating step, the print setting information is converted to the intermediate command based on the integrated first definition data.

13. The non-transitory computer-readable storage medium as claimed in claim 9, wherein the process further comprises:

a second integrating step of integrating plural pieces of the second definition data, and in the print command generating step, the intermediate command is converted to the print command based on the integrated second definition data.

14. The non-transitory computer-readable storage medium as claimed in claim 9, wherein the print control program causes the intermediate command generating step of converting to convert, using the first definition data, the print setting information to the intermediate command with reference to an interrelationship between the first definition data and the external processing unit.

* * * * *